United States Patent [19]

Wiley et al.

[11] Patent Number: 4,724,439

[45] Date of Patent: Feb. 9, 1988

[54] MICROWAVE RADIOMETER USING FANBEAM INVERSION

[75] Inventors: Carl A. Wiley; Charles R. Edelsohn, both of Los Angeles, Calif.

[73] Assignee: Hughes Aircraft Company, Los Angeles, Calif.

[21] Appl. No.: 15,543

[22] Filed: Feb. 12, 1987

Related U.S. Application Data

[63] Continuation of Ser. No. 607,869, May 7, 1984.

[51] Int. Cl.$^4$ .............................................. G01S 3/02
[52] U.S. Cl. .................................. 342/351; 342/372; 342/375; 342/400
[58] Field of Search ............... 342/351, 372, 375, 400, 342/460, 422, 426, 425, 423, 185, 115, 191, 154, 155, 360; 343/771, 780, 779

[56] References Cited

U.S. PATENT DOCUMENTS

| | | | |
|---|---|---|---|
| 3,482,244 | 12/1969 | Gadenne | 343/16 R |
| 3,808,596 | 4/1974 | Kazel | 343/100 |
| 4,178,100 | 12/1979 | Levis | . |
| 4,509,048 | 4/1985 | Jain | 343/5 W |
| 4,553,145 | 11/1985 | Evans | 343/360 |

OTHER PUBLICATIONS

*Proceedings of the IEEE*, vol. 71, No. 8, Aug. 1983, New York (US), pp. 917-925, D. C. Munson et al.: "A Tomographic Formulation of Spotlight-Mode Synthetic Aperture Radar".
*Proceedings of the IEEE*, vol. 61, No. 9, Sep. 1973, New York (US), pp. 1211-1218, E. B. Fomalont: "Earth-Rotation Aperture Synthesis".
*IEEE Journal of Oceanic Engineering*, vol. OE-2, No. 2, Apr. 1977, pp. 172-178, New York, P. Gloersen et al.:
"A Scanning Multichannel Microwave Radiometer for Nimbus-G and Seasat-A".
*Proceedings of the IEEE*, vol. 66, No. 5, May 1978, pp. 508-509, New York (US), F. S. Weinstein: "Accurate Four-Beam Reconstruction".
Sattelite-Borne Microwave Sensors May Improve Weather Forecasts, Electronic Design, vol. 24, No. 14, pp. 22, 24, 7/5/76.
Raabe, Weather Radar System, IBM Technical Disclosure Bulletin, vol. 13, No. 8, 1/71, pp. 2197-2199.

*Primary Examiner*—Theodore M. Blum
*Assistant Examiner*—David Cain
*Attorney, Agent, or Firm*—J. A. Sawyer, Jr.; M. J. Meltzer; A. W. Karambelas

[57] ABSTRACT

A microwave radiometer reconstructs images by fanbeam inversion. True time delay (100), frequency (600, 700) and mechanical scanning systems (200) are disclosed. The mechanically scanning radiometer includes a fanbeam antenna (210) to scan a scene so that the antenna output is a projection of the scene taken along the direction of scan. The mechanical scanning motion is provided by a rocking motor (254) controlled by a computer (214). Projections are obtained for successive orientations as the antenna is rotated by another motor (212). By application of an inverse Radon transform, the scene scanned is reconstructed by the computer.

In one frequency scanning system (600), a filter bank spectrometer is implemented to obtain the projections, and in the other frequency scanning system (700), a transform spectrometer implemented. In the delay scanning system (100), a beam forming computer is used in the reconstruction process. A modification of the Radon transform is disclosed which compensates for the conicity of electronically scanning fanbeams.

9 Claims, 13 Drawing Figures

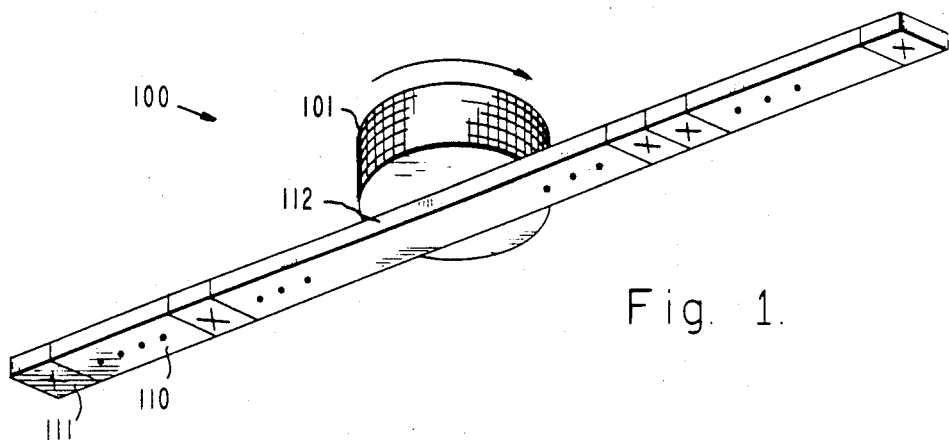
Fig. 1.
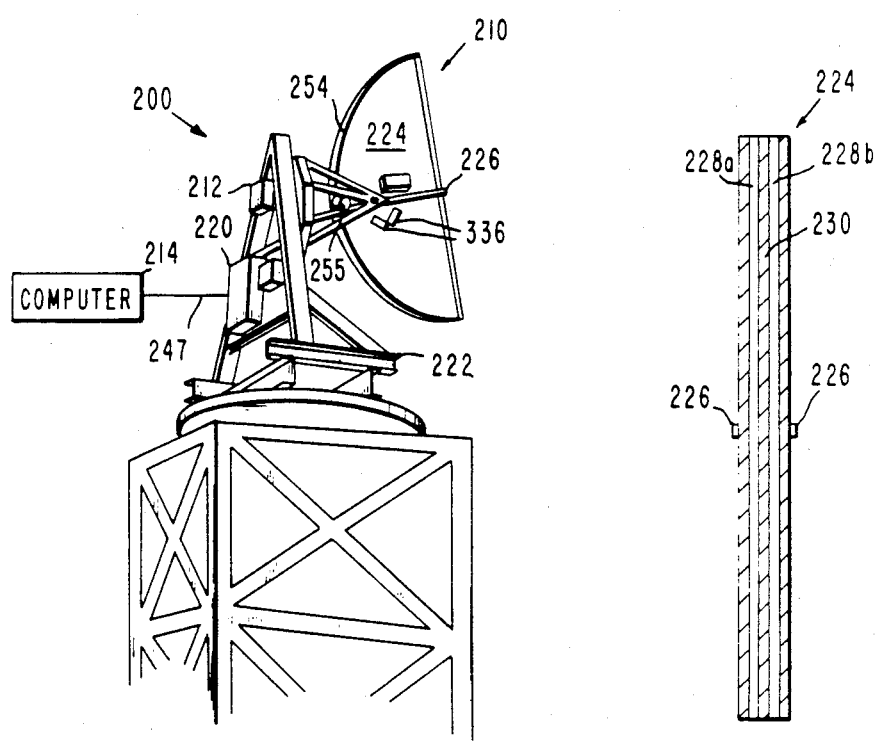
Fig. 2.
Fig. 4.

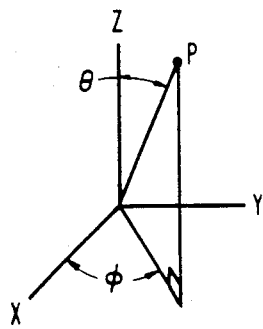

Fig. 9.
PRIMARY SPHERICAL AND CARTESIAN COORDINATE SYSTEMS.

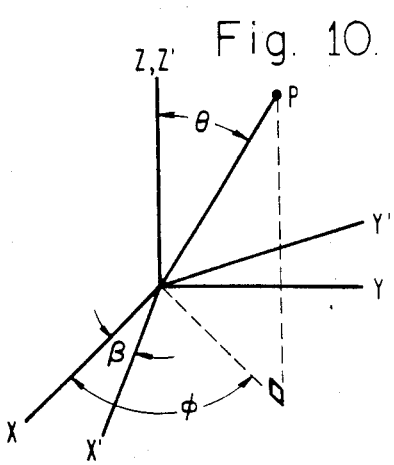

Fig. 10.
AUXILIARY CARTESIAN COORDINATE SYSTEM SUPERIMPOSED UPON PRIMARY SPHERICAL AND CARTESIAN COORDINATE SYSTEMS.

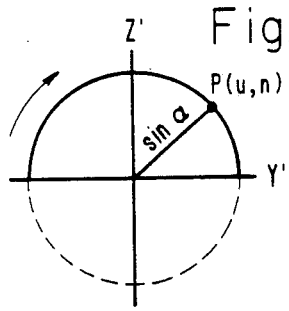

Fig. 13.
PROJECTION OF THE INTERSECTION OF THE CONICAL SHEET WITH SEMI-APEX ANGLE $\alpha$ WITH THE UNIT SPHERE ONTO THE Y'-Z' PLANE.

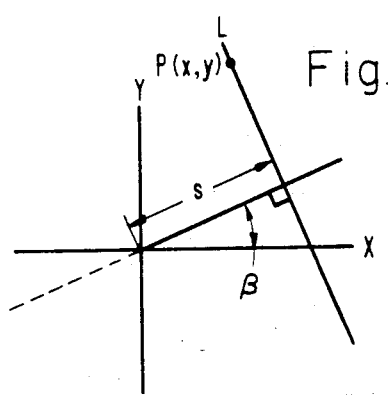

Fig. 11.
COORDINATE SYSTEM FOR EXPLICIT REPRESENTATION OF THE RADON TRANSFORM.

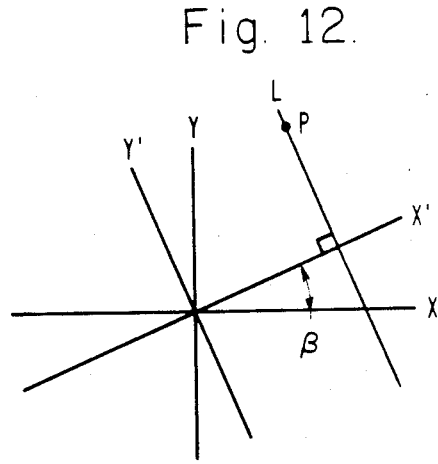

Fig. 12.
AUXILIARY PLANE CARTESIAN COORDINATE SYSTEM SUPERIMPOSED ON PRIMARY PLANE CARTESIAN COORDINATE SYSTEM.

MICROWAVE RADIOMETER USING FANBEAM INVERSION

This application is a continuation of application Ser. No. 607,869, filed 07 May 1984.

BACKGROUND OF THE INVENTION

The present invention relates to microwave radiometers, and more particularly to a system for determining the microwave radiation distribution of a scene using fanbeam inversion.

There are many applications requiring a mobil microwave imaging or mapping system capable of high resolution from long distances and over a wide field of view. Among these are aerospace, meteorological, oceanographic, and astronomical applications. More specifically, microwave radiometers are well suited for: mapping terrestial, planetary, and oceanic features; measuring atmospheric water vapor, rain, and sea surface temperature; and assessing hydrographic phenomena and surface conditions below clouds or rain.

By way of example, present meteorological radiometric mappers are limited to visible and infrared frequencies which at best weakly penetrate cloud cover. Thus, present systems are prevented from obtaining continuous observation of the Earth's surface. Portions of the microwave radiation spectrum (1 mm to 1 m wavelengths, herein) readily penetrate cloud cover. Thus, a microwave radiometer could provide all-weather continuous satellite imaging of the Earth's surface for meteorological and other applications.

Microwave imaging presents a challenge in terms of instrument size and weight. For most of the applications listed above, antenna dimensions on the order of ten meters and more are required. Clearly, standard "dish" antennas are cumbersome to build and deploy. For example, a microwave imaging system in geosynchronous orbit capable of matching the available fifty meter resolution of infrared and visible imagers might require a dish antenna one kilometer in diameter and might weight 4,000,000 pounds.

One method, classical aperture synthesis or CAS, provides for limiting size and weight on Earth-based systems. In the CAS systems first built, two or more antenna elements are moved relative to each other to span a constructive aperture of the desired dimensions. An image can be reconstructed from the spatial frequency spectra thus obtained from the various relative positionings. More recently, CAS systems have employed arrays of elements which are cross-correlated in various combinations.

A disadvantage of CAS is the requirement of an array support system or track system to control the movement of the antenna elements. This is most serious in situations where the antenna must operate without the physical support of the Earth or other support structure vary large relative to the antenna; the array support or track may weigh as much as a filled aperture array with comparable performance. Furthermore, the sensitivity of a CAS system is far below that of a comparable full-aperture system. The low sensitivity increases the time required for forming an image. Another disadvantage of CAS is the power required for the relative movements. These disadvantages are particularly significant in geosynchronous meteorological applications.

With the advent of computers, the computation power and new mathematical techniques for reconstructing images from data collected by line-source antennas became available. These techniques were applied by radio astronomers who built large linear antenna arrays. The data gathered by these antennas as the Earth rotates is collected and then processed to form an image of a star field.

Accordingly, viable imaging systems have been built which are well adapted to determining the source direction of radio waves where the source is effectively a point source an astronomical distance away. On the other hand, such systems have several limitations. They do not create precise images when the target covers a wide field of view, such as an earth meteorological scene when viewed from a satellite. Secondly, the images they provide are distorted as a function of angular displacement of the target from the Earth's polar axis. Thirdly, such an antenna cannot view stars in the opposite polar hemisphere. Additionally, such antennas lose resolving power as the imaged area approaches the equatorial plane.

Another disadvantage is that the time required for a complete image reconstruction is limited by the revolution rate of the Earth to about twelve hours. Furthermore, the Earth cannot be a target of these Earth-bound antennas for two reasons: one cannot reconstruct an image of a scene that rotates at the same rate as the line-source antenna, and the Earthbound antennas cannot be positioned readily to view the Earth from a useful distance. Finally, these antennas cannot be transported readily to look at disparate targets and cannot be incorporated practically in aerospace and terrestial vehicles.

Furthermore, since they are located far from the Earth's poles, these antennas rotate about an axis thousands of miles from the antennas. Therefore, the distance between the axis of rotation and the antenna is much greater than any physical dimension of the antenna itself. This proves unwieldy in a portable design and introduces parallax errors unacceptable for most non-astronomical applications. Since the size and weight of these line-source antennas are proportional to the diameter of the equivalent two-dimensional antenna, rather than the square of that diameter, considerable materials and related savings accrued in the construction of these antennas, one of which was about 1700 ft long.

What is needed for meteorological and other applications is a transportable and/or orbitable microwave radiometer which can image independent of the Earth's rotation rate and over a relatively near range and a wide field of view.

SUMMARY OF THE INVENTION

In accordance with the present invention, a microwave imaging system, or other system for determining the microwave radiation distribution of a scene, includes a line-source or other fanbeam antenna for receiving microwave radiation along fanbeams. The system includes a motor or other means for rotating the fanbeams relative to the Earth; an orientation sensor tracks the orientation of the fanbeams. Provisions are made for reconstructing the distribution or image from data provided by the antenna and the orientation sensor.

The fanbeams constitute either a plurality or a continuum, and may be produced successively or concurrently. Each fanbeam has a position relative to the remaining fanbeams, and, collectively, the fanbeams should subtend the scene to be imaged. The rotating means, which may include the angular momentum of the rotating antenna, is used to rotate the fanbeams relative to the Earth or scene to be imaged.

Provision is made for transforming signals from the antenna and the sensor to provide one-dimensional radiation (or "microwave brightness") functions, with associated rotational orientations. The one-dimension functions may be described as line integrals, projections, or alternative functions, as these terms are used in the image reconstruction field. Preferably, a series of one-dimensional functions corresponding to orientations collectively spanning 180° suffices to produce the data required for image reconstruction. Actually, an image can be reconstructed from less than 180° rotation data.

A computer, a system of computers, or other computing means may be used to reconstruct the desired microwave power distribution of the scene from the one-dimensional functions and their associated rotational orientations. In satellite imaging systems, the recontruction can be effectively distributed between an on-board computer and a ground station computer with a display and/or an image recording device. The computing means may include the means for transforming the antenna and sensor outputs into one-dimensional functions.

The computer may include an algorithm for assembling a two-dimensional radiation function from the one-dimensional radiation functions provided as a function of fanbeam orientation. In some embodiments, e.g. one employing the back-projection algorithm, this two-dimensional function is the desired image. In other embodiments, an algorithm is provided for reconstructing the microwave distribution or image from the two-dimensional functions.

The present invention provides for correcting for beam shape. Deconvolution in two dimensions corrects for the side lobes as well as for the non-zero thickness of the primary beam. A novel beam-shape transform is disclosed for systems having conical fanbeams, such as the frequency scanning and delay scanning embodiments to be described.

The invention provides for a system with an axis of rotation, the distance of which from the antenna is less than the maximum physical extent of the antenna. Furthermore, the antenna may rotate relative to a physically connected body, as in a dual-spin satellite.

In one of its realizations, the invention includes a mechanically scanning parabolic-section antenna, generally known as a "pillbox" or "cheese" antenna. Such an antenna may have a generally planar fanbeam from which the functions previously described are produced sequentially. In operation, the antenna is scanned along a direction orthogonal to the fanbeam plane. The result is a continuum of fanbeams produced sequentially. The output of the antenna may be treated as a continuum or digitized into discrete fanbeams. Upon completion of each linear scan, the antenna is rotated and the linear scan is iterated for successive orientations over a 180° arc. A mathematical algorithm is applied to the data so collected to produce a reconstructed image. Beam thickness and side lobes are corrected through deconvolution.

In another of its realizations, the imaging system includes an electronically scanning antenna. The scanning may be by phase, delay, or frequency scanning. The fanbeams are produced concurrently in the form of coaxial conical fanbeams. The antenna may be a line-source antenna spun like a propeller about one of its own axes, or another relatively near axis. A mathematical algorithm is applied to the data to obtain a reconstructed image. Beam shape correction means, which may include the disclosed conical fanbeam inversion, can be employed to correct for the conicity of the fanbeams.

This invention allows a thin, lightweight, line-source antenna to be used in aerospace microwave radiometry instead of a heavy, full dish reflector. The one-dimensional functions required by this approach may be obtained by the transformation of the one-dimensional measurements made by the antenna. The weight of the line-source antenna is proportional to its length, while the weight of the equivalent dish is proportional to its area, or length squared.

The present invention provides several additional advantages over prior devices. The Earth independence of the system provides flexiblity in imaging times and targets. Embodiments of the invention can be built to view in any direction; in particular, the Earth can be viewed for meteorological and other applications. The imaging time can be significantly less than the twelve hours required for Earth-bound imagers. Thus, sharp images may still be obtained where the scene is changing or moving relative to the system, provided the rate of reformation is slow relative to the rotation of the antenna.

Furthermore, the present invention is not limited to the astronomical range and small field of view limitations of prior systems. The inclusion of beam-shape correction, such as deconvolution or conicity correction, allows accurate reconstruction of wide fields of view, which are the general case in meteorological applications. The relation between antenna length and the distance from the spin axis provides portability and minimizes or eliminates parallax error for "near-range" scenes—e.g. geosynchronous viewing of the Earth's surface. Also, centrifugal force in spinning antenna systems contributes to their structural rigidity, thus ameliorating a potential source of signal distortions in large antennae due to bending. Generally, the present invention provides an imaging system for use at microwave frequencies which is compact, lightweight, easily deployable, and able to achieve high resolution over a wide field of view.

BRIEF DESCRIPTION OF THE DRAWINGS

FIG. 1 is a perspective view of the spaceborne components of an electronically scanning imaging system in accordance with the present invention using a delay scanning antenna.

FIG. 2 is a perspective view of a mechanically scanning imaging system in accordance with the present invention.

FIG. 4 is a front elevational view of the antenna reflector for the imaging system of FIG. 2.

FIGS. 9-13 illustrate certain concepts in connection with the explanation of a mathematical transform described in a reference incorporated in the present application.

DESCRIPTION OF THE PREFERRED EMBODIMENTS

Figure 3:
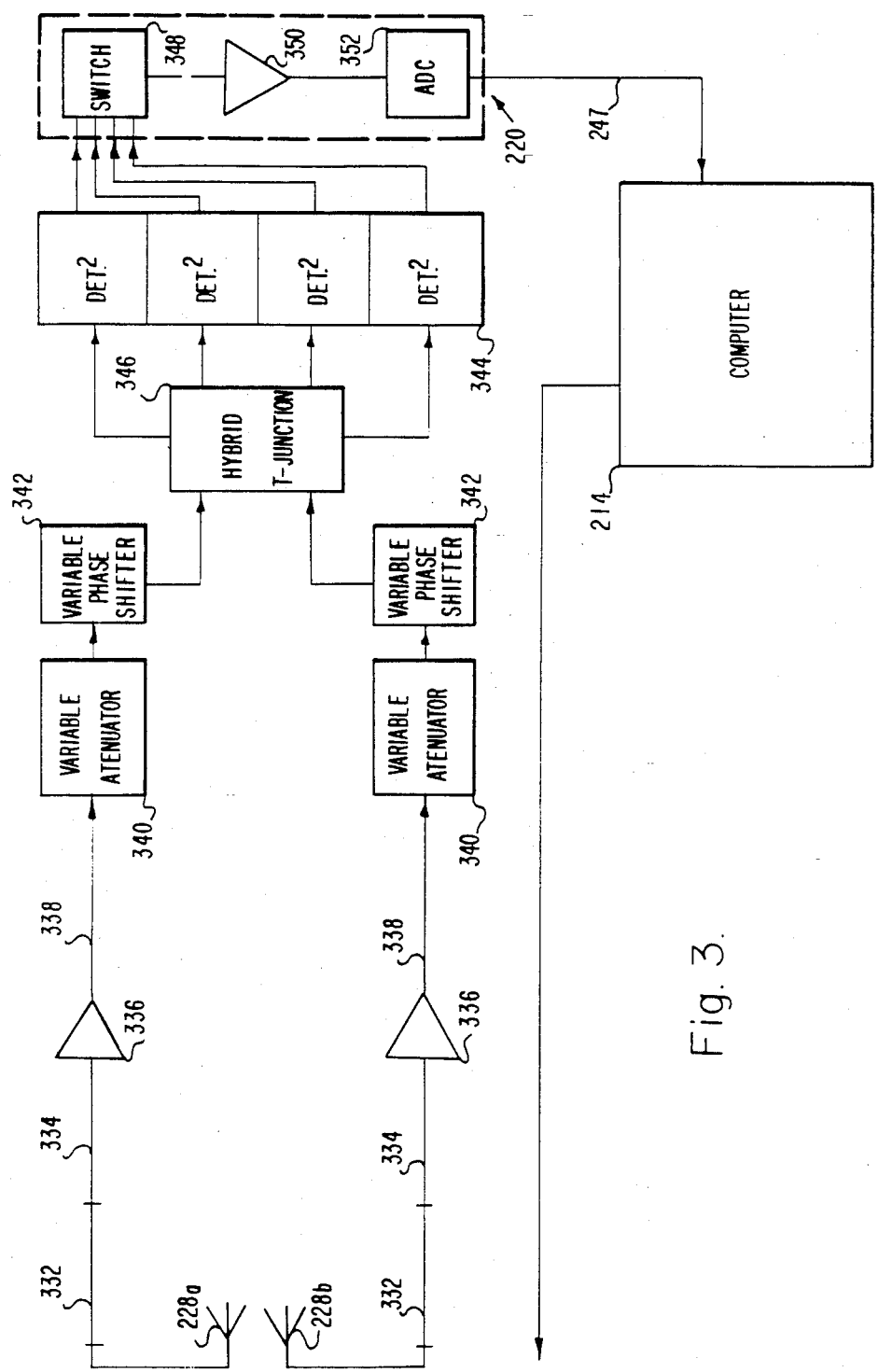
FIG. 3 is a schematic of the imaging system of FIG. 2

The present invention may involve either mechanical or electronic scanning techniques in determining the microwave radiation distribution of a scene. An imaging system 100 with an electronically scanning antenna 110 is shown in FIG. 1. An imaging system 200 employing a mechanically scanning antenna 210 is shown in FIG. 2.

Each imaging system employs an antenna 110, 210 for receiving microwave radiation along plural or a continuum of fanbeams. As used herein, "antenna" refers to any apparatus or means for transmitting and/or receiving electromagnetic radiation; "fanbeams" refers to a beam with elongated linear or curvilinear cross-section, taken orthogonal to the direction of propagation.

In either case, relative fanbeam position can be determined as a function of an independent variable. In the mechanically scanning embodiment, the independent variable may be time and/or orientation. Depending on antenna design, time, phase gradient, or frequency may be the independent variable in the electronically scanning version. If desired, the fanbeam continuum may be treated as a plurality of discrete fanbeams by digitizing or segmenting the independent variable.

Each embodiment includes means for rotating the fanbeams relative to the Earth. Normally, this involves a motor 112, 212 rotating the antenna 110, 210 itself. In a satellite system, the satellite angular momentum is itself a means for rotating the antenna—which may be supplemented by various mechanisms for occasional corrections. The invention also provides for electronic rotation of the fanbeams where the antenna itself is not rotated, for example, by successive electronic addressing of radial series of antenna elements arranged in a circular array.

In each of the embodiments disclosed, the axis of rotation intersects the antenna. Alternatively, the antenna could rotate about a satellite or other body, the distance between the axis of rotation and the antenna being less than the length of the antenna. This permits a transportable design and minimizes parallax problems.

An orientation sensor (not illustrated), i.e. a means for detecting the rotational orientation of the fanbeams, can be provided in a number of ways. The orientation may be determined by a computer where it controls the movement of the antenna or by feedback from an angular position or velocity sensor.

Each disclosed system 100, 200 transforms signals received from its antenna 110, 210 and sensor into one-dimensional radiation ("microwave brightness") functions. In the illustrated mechanically scanning embodiment, these functions are projections, which are processed by a "back-projection" method to reconstruct the image. In one frequency scanning embodiment 600 (FIG. 6), a projection is obtained and Fourier transformed so that microwave radiation is represented as a function of spatial frequency, i.e. the spatial frequency function or spectrum is obtained. In another disclosed frequency scanning embodiment 700 (FIG. 7), the spatial frequency spectrum is the one-dimensional function and is obtained directly by autocorrelation. In other embodiments, one-dimensional functions other than a projection or spectrum are used.

The disclosed systems include computing means for reconstructing the microwave radiation distribution of the scene from the one-dimensional functions and their associated orientations. The computing means may be integrated or distributed, as between a on-board satellite computer and an Earth-station computer. Directly or indirectly, a two-dimensional function is assembled. Depending on the alogorithm applied, this function or a transform thereof represents the reconstructed scene or distribution, which may thus be displayed or otherwise utilized.

MECHANICALLY SCANNING EMBODIMENT

The mechanically scanning embodiment, illustrated in FIG. 2, comprises imaging system 200 which includes a computer 214, an antenna 210, and an antenna-to-computer interface 220. The latter two are mounted on a support structure 222.

The antenna 210 includes a dual pillbox reflector 224 and waveguide feedhorns 226. As shown in FIG. 4, the reflector 224 includes two sections 228a and 228b separated by a partition 230 of aluminum honeycomb, which is chosen because it is lightweight and conductive. The rear of the reflector 254 is parabolic and the focal point is at the waveguide port. The antenna reflector 224 is about 10 ft long and $\frac{1}{4}$ wavelength thick in each half section 228a and 228b at the center of the frequency band, 15 GHz. The beam width of the antenna 210, in the narrow dimension of the fanbeam, is determined by the length (10 ft) and defines the resolution of each element of the projections. In this embodiment, the beamwidth is about $\frac{1}{4}°$. The field of view along the projection is about 40°.

The feedhorns 226 are connected by lengths of waveguide 332 and coaxial cable 334 to dual FET (field effect transistor) amplifiers 336 as indicated in FIG. 3. The amplifiers 336 span a frequency range, for example 12-18 GHz. Two FET amplifiers 336 for each section 228a, 228b are used to attain the 70 dB gain desired for detecting thermal microwave radiation from a typical scene.

The outputs of the amplifiers 336 are connected via waveguide runs 338 to variable attenuators 340 and variable phase shifters 342 housed with the interface 220. The purpose of the attenuators 340 is to adjust the level of the signal to within the square law detection range of diode detectors 344. A secondary purpose is to balance the signals for use in a correlation receiver mode. The purpose of the phase shifters 342 is to adjust the phase of the signals for proper operation of the correlation mode.

The outputs of the phase shifter 342 on each side of the antenna 210 are combined in a network of E-plane folded hybrid T junctions 346. These are arranged to provide for four microwave signals representing the following: (1) the output of one section 228a, labeled "A" herein; (2) the output of the other section 228b, labeled "B" herein; 3) the coherent sum of A and B; and (4) the coherent difference of A and B. These four microwave outputs or signals are detected by the square law detectors 344, and the corresponding detected outputs are connected by coaxial cables to the interface 220.

For purposes of further processing, any combination of modes can be examined. The contribution of either section 228 can be considered by processing the A or B component separately. By combining the detected A and B components in the correlation mode, better performance can be achieved.

The correlation mode is used for improved signal-noise performance, and examines an A×B term. This product term is the result of the difference between the squares of the A+B and A−B components produced by the hybrid. The squaring is performed by the square-law detectors. The subtraction is performed by the pushpull operation of the amplifiers 350 to be described.

The purpose of the interface 220 is to amplify and digitize the detector output so that it can be transmitted reliably over the length of multi-channel cable 247 required between the support structure 222 and the computer 214. The interface includes a selector switch 348, integrated amplifiers 350, and an analog-to-digital converter 352.

The selector switch 348 allows connection between any of the four detector outputs and any of the four amplifier channels included in the interface 220. The integrator amplifiers 350 include preamplifier sections which provide the load for the detectors 344, and operational amplifiers. The integrator amplifiers 350 include bandpass filters to perform the necessary time integrations, and limiters to suppress interference. The amplifiers 350 are selected to be accurate and gain-stabilized.

The output of the integrator amplifiers 350 is a low frequency AC representation of the projection of the scene scanned by the antenna. This analog output is integrated and digitized by the A-D converter 352. The digitized signals are transmitted to the computer 214 over the multi-channel cable 247.

The computer 214 (a CT 4001 acquired from Omnimedical, of Paramount, California) in the illustrated embodiment is designed for computer aided tomography (CAT), and modified for the present application. More particularly, the normal rotational orientation interval for the CAT scanner is 3°. This has been modified to handle ¼20 intervals to utilize the full resolution of the antenna.

The computer 214 also provides control of an interface to the antenna drive motors 212 and 255. While the rotation motor 212 determines the orientation of a given series of fanbeams, the rocking motor 255 generates the series of fanbeams at each orientation. The rocking motion corresponds to the translational motion of a CAT scanner. For the antenna 210, the rocking motion successively scans the single fanbeam produced by the pillbox antenna 210 over a −20° to +20° range. This in conjunction with the roughly ¼° beamwidth provides 128 beams in the field of view. Data samples are collected twice per beam width, yielding 256 data points per scan.

After each rocking motion in one direction, the rotation motor 212 rotates the antenna 210 through a ¼° increment. At this time, the antenna 210 is rocked in the opposite direction and the process in repeated until 540 successive rotational positions (180°) are covered. The time required to gather the 540 projections is about 30 minutes.

The motor drives normally used with the CAT unit were adapted to these functions by substituting drive via cables wound on a capstan for the rocking instead of translation. The rotational motor needed no modification, but was connected to the antenna rotating mount through a gear-belt drive.

The orientation sensor function is provided by rotational incremental position measurement. The rate of rocking motion of the antenna 210 and the instantaneous incremental position of the antenna are measured by a curved reticle consisting of successive black paint stripes on a glass surface moving past a photo-electric cell (not shown). This is also an adaptation of the CAT scan drive which uses a similar but straight reticle.

The rotational position is measured by counting the rotations of the rotation motor 212 through a metal plate with cutouts which interrupt light received by a photocell. The modification here is to change the number of cutouts per rotation in accordance with the different gear drive ratio of the antenna. Cabling is provided for the computer 214 to control the motors 212 and 255 and to communicate with the sensing devices.

Preferably, the computer 214 incorporates an algorithm permitting beam shape correction. The sensitivity or beam pattern of an antenna may be computed from theoretical considerations or, preferably, determined empirically. The empirical determination may involve comparison of a reconstructed image with an original scene comprising well-defined point sources. A typical program which can be utilized to reconstruct an image from one-dimensional functions is commercially available from Prof. Gabor T. Herman and is entitled "SNARK 77". The results of scanning in the present case yield a beamwidth of ⅛° to ¼° and side lobes, the exact dimensions being a function of frequency. Generally, and in the present case, once the sensitivity pattern is determined, a beam-shape can be corrected.

In one variant of the present embodiment, deconvolution is effected through the use of matched filters, which may be a series of digital computer transformations. The modulation transfer function of the matched filters is the complex conjugate of the Fourier transform of the antenna sensitivity pattern. The matched filters are designed to respond to predetermined waveforms with a pulse, the amplitude of which corresponds to the total energy of the waveform. The output of the matched filter provides deconvolved information for forming the projections or other one-dimensional functions.

FREQUENCY SCANNING

Figure 5:
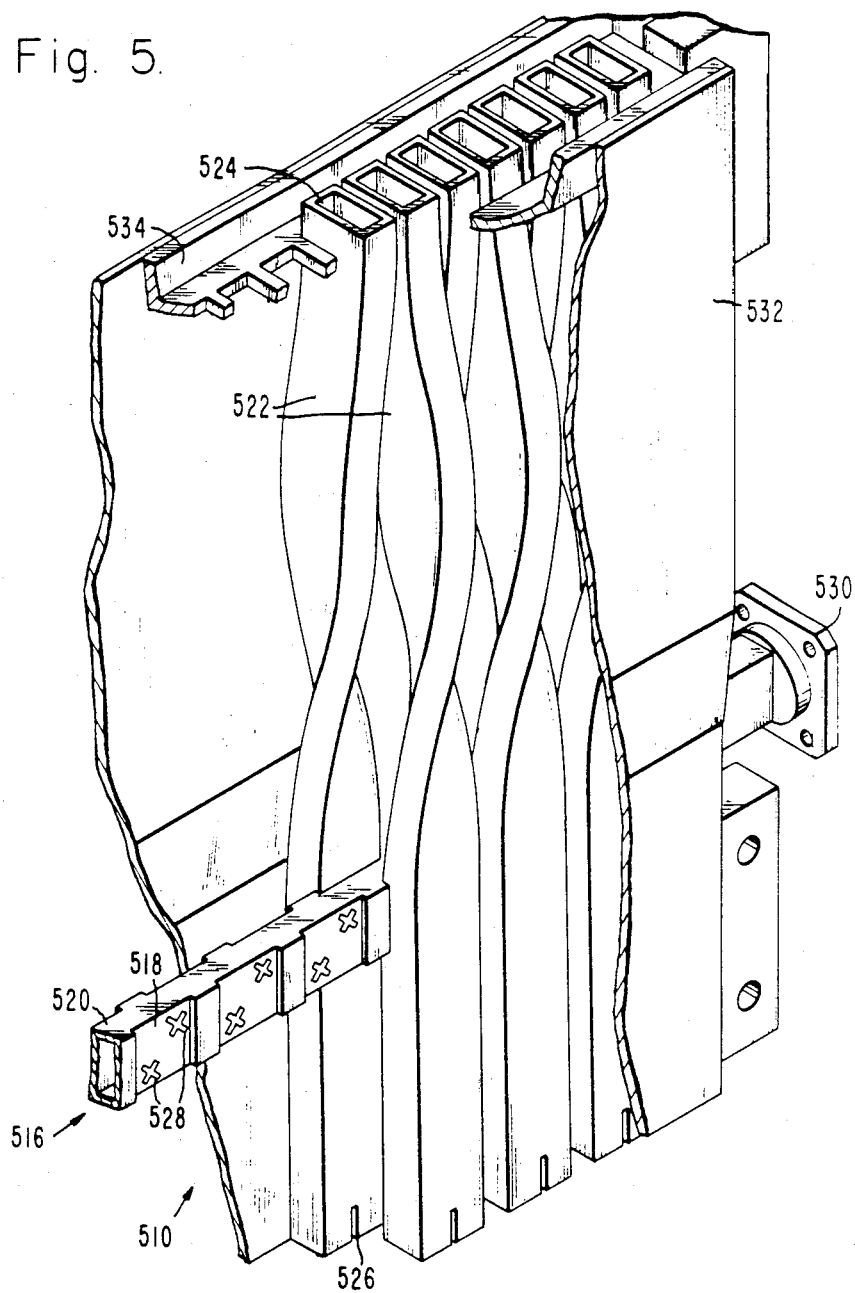
FIG. 5 is a perspective sectional view of an antenna used in the frequency scanning embodiments of the present invention.

Disclosed below are two frequency scanning imaging systems 600, FIG. 6, and 700, FIG. 7, one employing a channelizing filter bank 614, and the other employing an autocorrelator 714. The two systems use the same antenna 510, a section of which is illustrated in FIG. 5.

The frequency scanning antenna 510 may be considered as a waveguide with multiple slots. Since the wavelength of the energy traveling down the guide varies with frequency, the relative phase of the energy radiated from the slots varies also. At a frequency corresponding to a guide wavelength equal to the slot spacing, the energy will combine at the far field to form a maximum in the broadside direction. At frequencies other than multiples of the fundamental broadside frequency, the phases in each slot will be shifted relative to every other slot so that the energy received will add up to a maximum only in another direction at some known offset angle. Thus, the pattern maximum varies smoothly as a function of frequency.

In the illustrated antenna 510, one feed 516 is employed. Alternatively, two or more feeds could be used. The illustrated feed 516 is a waveguide with a has a rectangular cross section to support only a $TE_{01}$ mode.

This means zero resonances parallel to the broad walls 518 and one resonance mode parallel to the narrow walls 520. In other embodiments, other modes, cross sections, and feed structure are possible; e.g., rigid coaxial transmission line could be used.

The illustrated radiating elements 522 are also rectangular waveguides. Alternatively dipoles or other structures could be used. The radiating elements 522 are twisted so that they align with their broad walls adjacent at their radiating ends 524, and with narrow walls adjacent at the feed 516 and at the ends with loads 526. The radiating elements 522 are staggered above and below the feed 516 for compactness and to achieve an $M=\frac{1}{2}$ scan mode. This mode is accomplished since the staggering makes the signals received by the feed 516, from adjacent radiating elements, 180° out of phase.

The $M=\frac{1}{2}$ scan mode is desired so that the broadside field of view can be spanned. Without staggering or an alternative phase shifting technique, the $M=1$ mode would prevail, and only the forward half of the broadside field of view would be scanned. In this case, imaging would require 360° of rotation, rather than 180°.

Coupling between the radiating elements 522 and the feed 516 is provided by Moreno couplers 528 in the form of cross-shaped holes. These couplers 528 are selected for their broad bandwidth capabilities, required by the frequency scanning antenna. The couplers 528 are arranged to couple the paths between the radiating ends 524 and feed port 530 and the paths between the radiating element loads 526 and the feed load (not shown) so that direction signals are received at the reflections are diverted from the feed port 530.

The loads 526 at the ends of the radiating elements and the feed loads absorb unwanted power from reflections in a manner well known in the art. In addition, structural elements 532 providing support, rigidity, and protection from space radiation or other environmental factors are employed according to the intended application. The radiating end of the antenna 510 includes a trough 534 to damp surface waves and to prevent their coupling to the radiating elements and causing beam dropouts. The beam dropouts would show up as beam holes in the antenna output, and hence the microwave spectrum. Alternatively, dielectric plates over the radiating element ports could be used.

The illustrated antenna 510 is designed for a frequency bandwidth of about 12 to 18 GHz; and may be about 150 inches along the feed, 10 inches along the radiating elements and 1.7 inches thick. The radiating elements comprise three hundred twisted waveguides on a 0.502 inch pitch. The feed and radiating element cross sections are about 0.702 inch by 0.391 inch.

Figure 6:
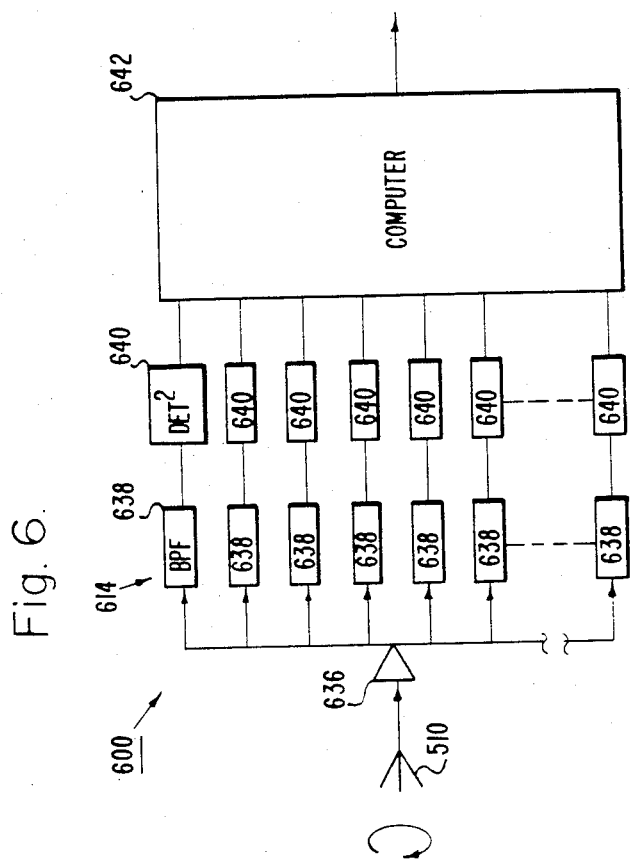
FIG. 6 is a schematic of a filter bank frequency scanning imaging system in accordance with the present invention.

In the embodiment illustrated in FIG. 6, the signals exit the antenna 510 via a transmission line and are amplified by a FET amplifier 636. The amplified signal is filtered by a channelizing filter bank 614. The channelizing filter bank 614 includes a bank of two hundred fifty-six filters 638 and respective square-law detectors 640 in this embodiment to provide a 128 pixel resolution image. Other numbers of resolution elements would receive other numbers of filters. The channelizing filters may be a set of bandpass filters, each tuned to a respective center frequency width and operating in parallel.

The detector output voltage represents the power received by the antenna from the fanbeam addressed by the frequency band of the associated filter. Hence, the detected outputs of the filter bank 614 constitute a projection of the microwave radiation as a function of fanbeam position.

The projection is entered into the computer 642 for subsequent image reconstruction and display. Where, as might be desirable in a satellite, the projections are to be transmitted to an Earth-station computer for the processing, an on-board computer is used to store or buffer the projections pending transmission.

AUTOCORRELATION FREQUENCY SCANNING

Figure 7:
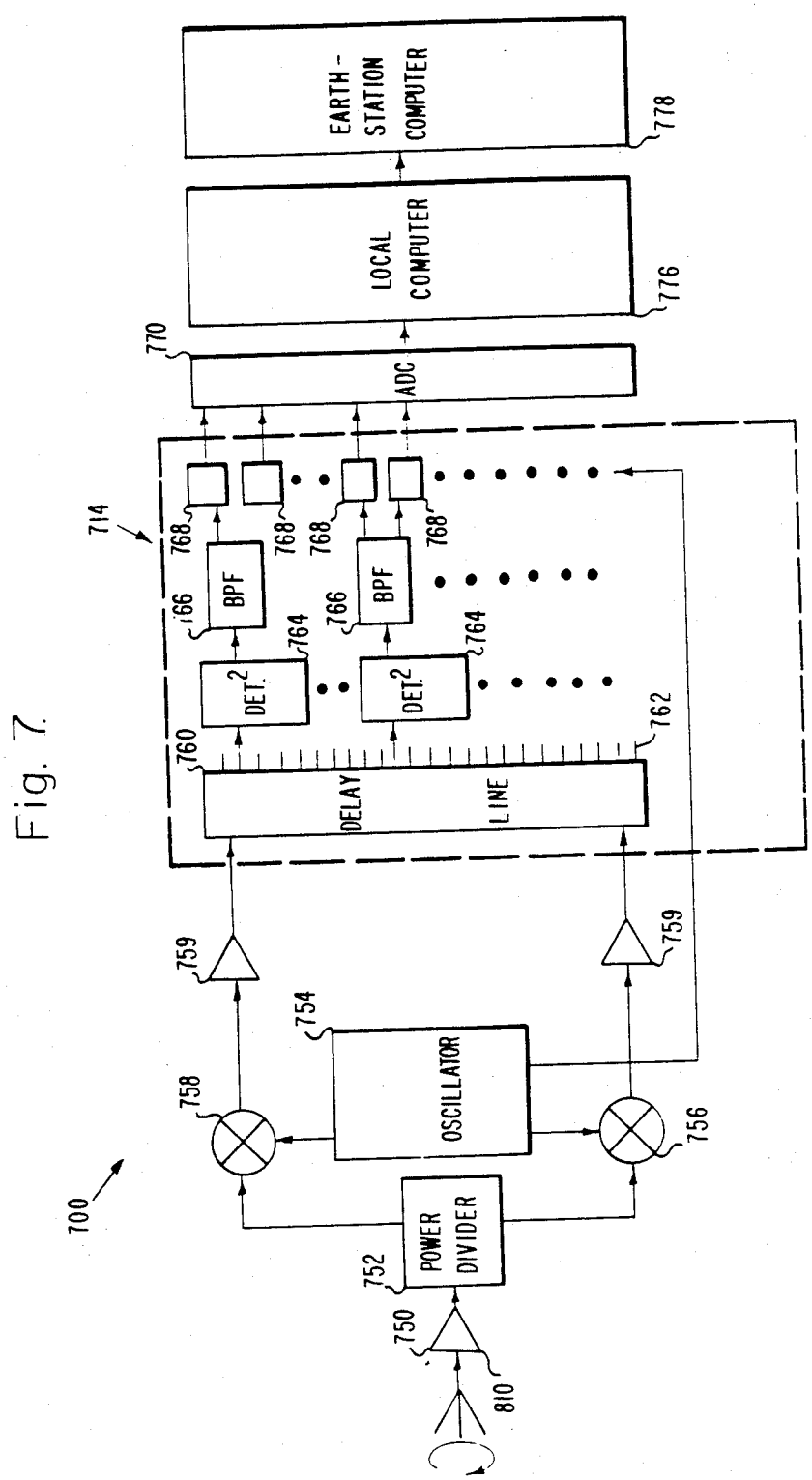
FIG. 7 is a schematic of an autocorrelation frequency scanning imaging system in accordance with the present invention.

In the autocorrelation frequency scanning imaging system 700, shown in FIG. 7, the spatial frequency spectrum of a frequency scanning antenna can be obtained directly by autocorrelation, rather than by taking the Fourier transform of the antenna output. According to the Weiner-Khinchin Theorem, the autocorrelation function of a function is the Fourier transform of the power spectrum of the function. In the case of the frequency scanning antenna, then, the autocorrelation of the antenna output is the spatial frequency spectrum of the scene (for a given antenna orientation). The frequency spectra so produced can be processed as the frequency spectra of the filter bank frequency scanning imaging system 600 to yield the desired image.

Autocorrelation requires the same signal to be combined multiple times with varying time differences. In the illustrated autocorrelation frequency scanning imaging system 700, a signal from the single antenna 510 is divided, and the differential delays are introduced in the signal components prior to multiple recombinations. Alternatively, dual antennas could be used, with each antenna providing one of the outputs to be correlated. In either case, autocorrelation provides an advantage in reducing noise contributed by the imaging system components which are not common to both signal paths.

The antenna output is coupled into a coaxial line with a FET amplifier 750. A power divider 752 splits the signal into the two components. A dual oscillator 754 is used to provide the local oscillator inputs to heterodyne the two signals to a convenient intermediate frequency (i.f.) for most of the amplification. The two local oscillator signals are offset relative to each other by a low frequency which is the offset reference. The offset reference is also supplied in both inphase and quadrature forms to the demodulators 768. Two mixers 756 and 758 are provided; mixer 756 combines a signal component with one offset local oscillator signal and mixer 758 combines the other signal component with the other offset local oscillator signal. The outputs of the mixers are amplified by i.f. amplifiers 759 prior to autocorrelation.

The illustrated autocorrelator 714 includes a multiplexed delay line 760 having two hundred fifty-six taps 762 the relative time delays of which provide for successive multiplications to effect autocorrelation. The delay line 760 shown makes use of the ability to insert signals at both ends of the lines. An alternative method is to use two delay lines with two matched sets of taps. The product of the signal components is obtained by the square-law detectors.

The output of each tap 762 is processed by a square-law detector 764 plus a bandpass filter 766 These filters 766 eliminate the DC and high frequency components of the product signals. The effect is to remove noise introduced by the system after the power divider 752 and to smooth or average the detector output. This smoothing approximates integration over time of the detector output.

Using low frequency reference signals from the oscillator 754, demodulators 768 synchronously demodulate the signal with the oscillator frequency as the reference to obtain inphase and quadrature (I and Q) signals. The signals are digitized in an A-to-D converter 770. The information is buffered in the memory of a local computer 776 so that a full scan of data is present.

In a spaceborne system, this is an optimum point for transmission of signals to an Earth-station computer 778. This point is chosen because the correlation process has given us the maximum bandwidth reduction so that the minimum transmission bandwidth is required. The Earth-station computer 778 then reconstructs the microwave brightness distribution from the data so obtained.

DELAY SCANNING

Delay scanning is an alternative electronic scanning approach which can be advantageous where narrow bandwidths or longer wavelengths are to be used. (For very narrow bandwidths, phase-scanning may be simplest to implement). In delay scanning, the antenna 110 comprises a linear array of discrete antenna elements 111 and signal paths which maintain phase coherency and are interconnected to form a multiplicity of beams after detection, similar to the way some sonar transducer systems work. (This approach is termed "beamforming" by some writers.) In the embodiment illustrated in FIGS. 1 and 8, the antenna 110 is rigidly attached to the spun portion of a dual-spin satellite 101. The remaining system components are housed in the despun portion, with the exception of an Earth-station computer 832.

The delay scanning or "discrete" antenna 110 is approximately 100 ft long and accommodates L band wavelengths. There are two hundred antenna elements 111 in a linear array with a 6 inch (about ½ wavelength) spacing. Each antenna element 111 is about 6.0 inches in crossed dipole configuration. Depending on the application, including the polarization of the signals to be received, other antenna element configurations could be selected.

Figure 8:
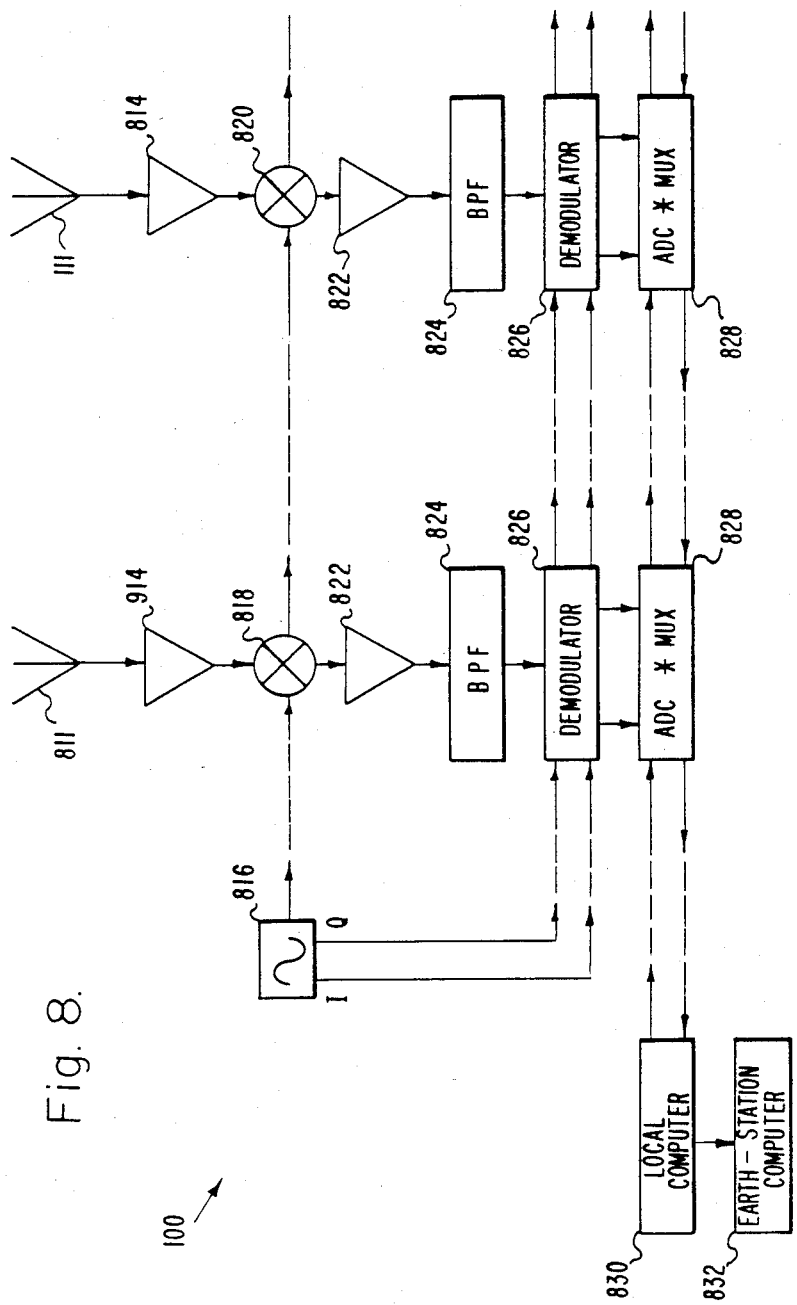
FIG. 8 is a schematic of the delay scanning imaging system of FIG. 1.

A portion of the electronic circuitry for the delay scanning embodiment, including a reference antenna element 811 and one of the one hundred ninety-nine other antenna elements 111, is illustrated in FIG. 8. A signal representing the microwave brightness distribution of a scene is received by all of the antenna elements. The signal is received at times which differ sequentially along the line array by a factor proportional to the sine of the angle between the direction of arrival and the broadside direction of the array. Amplifiers 814 are provided to amplify the signals from each antenna element 111, 811 for further processing.

An oscillator 816 supplies an inphase signal to a reference mixer 818 and the other mixers 820 which are respectively connected to antenna elements 111, 811. Accordingly, the signal output of each element 111, 811 is heterodyned down to a convenient i.f. for further amplification. Note that the local oscillator signal applied to the reference mixer 818 is displaced slightly in frequency from the local oscillator signals applied to all of the other mixers 820. The oscillator 816 also provides I and Q references for subsequent demodulation.

I.f. amplifiers 822 amplify the outputs of the mixers, and bandpass filters 824 centered around the oscillator frequency remove unwanted components from the signals. The reference I and Q signals are input sequentially to synchronous demodulators 826 associated with each antenna element. Since the desired signal may be background radiation which is many times weaker than the random noise of the instrument on an instantaneous time basis, the signal is integrated over a time period long enough to bring the signal energy up to a level higher than the instrument noise.

The demodulated and integrated I and Q outputs are directed to an associated digitizer/multiplexer 828 to produce a set of digital words representing the signals. At this point the words are buffered in an on-board computer 830 and subsequently transmitted to a Earth-station computer 832 for further processing. Of course, the further processing could be conducted locally if the application so warranted.

The Earth-station computer 832 shifts the words in parallel processors to apply the time delays which are necessary to form the beams in all desired directions. Because of the frequency difference between the local oscillator signal applied to the reference channel mixer 818 and all the other mixers 820, there is an AC beat note present in each signal pair. The computer 832 digitally filters out signals not at this beat frequency. The energy thus eliminated reflects unwanted noise introduced by the non-zero temperature of the antenna and the operation of the amplifiers and mixers.

The computer 832 performs the autocorrelation between shifted signal pairs formed by combining the reference signal with each of the other signals. Each pair is time-shifted the required amount so that equivalent energies sum vectorially only over the range of angles which correspond to the width of the narrow fanbeam.

This process is conducted in parallel for each of the fanbeams spanning the target scene. Since the processing takes place on a set of digital words, no loss of sensitivity is encountered in replicating the fanbeam signals for parallel processing.

From this point on the system employs image reconstruction algorithms, such as those described in connection with the frequency scan system 700. The processing can be repeated as the antenna rotates through 180°. The data so collected can be buffered and then processed according to the inverse conical transforms described above.

No sensitivity is lost by comparison with the methods which use a full aperture to scan the same area in the same time. This comes about because the linear array antenna used here views the entire scene which is to be imaged continuously, while a full aperture can view only one picture element (pixel) at a time. During the time required for a full aperture system to scan over the entire scene, the linear array system is rotating 180° to gather all the information required to form its image by reconstruction. Accordingly, the lesser gain of the linear array is compensated by the continuous spanning of the scene.

The fanbeam inversion processing actually reduces the noise level because of the averaging effect of the larger number of samples in each pixel. However, because the energy level at detection is lower, the square-law detection process decreases the signal to noise level of the fanbeam system relative to the pencil beam system. On the other hand, the fanbeam system is able to use correlation reception and other techniques to better advantage so that more energy can be gathered by the line antenna than by the pencil beam antenna.

The above-described embodiments are merely illustrative of the many variations and applications provided for by the present invention. It is recognized that other means of beam shape correction may be employed. Generally, where the beam pattern of an antenna is known, this pattern can be deconvolved from the antenna output to provide the data required for image reconstruction. Where the deconvolution algorithm is not known, uncorrected outputs may be used to approximate the image. For example, previously, conical fanbeams were treated as planar over small fields of view.

It should be noted that motion without change of shape can be compensated for in the computation algorithm by well-known means. This is, if a cloud field is moving at a constant velocity, the shape can be readily imaged.

However, if the shape of the cloud or other scene element is changing over the observation time (e.g., because of internal turbulence), the shape imaged will be averaged over the time of observation.

Terrestial, air-borne, and space-borne applications are available. In some space-borne systems, the vehicle and satellite could be a unitary structure; in other systems, the antenna could spin relative to the carrying satellite. The dimensions of the systems can be chosen to accommodate a range of wavelengths, ranges, and resolutions. Data collected may be processed in many ways according to fanbeam shape. A single aerospace vehicle might include multiple systems so that a broader range of signal types can be processed. Other embodiments and variations of the described embodiments are within the scope of the present invention, which is limited only by the claims.

This following section supplements the discussion on beam-shape correction and image reconstruction for the electronically scanning embodiments (although it explicitly refers only to the frequency scanning cases). The material is taken from a paper, not generally available, by Ross E. Graves. The paper refers to "Spinrad" which is a contraction of "spinning radiometer" and is descriptive of the electronically scanned embodiments disclosed herein. The Figure references have been changed to correspond to the numbering system of the application drawings.

"THE SPINRAD TRANSFORM AND ITS INVERSION" * * *

"1. INTRODUCTION"

". . . Observe that the beam corresponding to a given center frequency is a conical beam, rather than a pencil beam. The intersection of this conical beam with the terrain gives rise to an output power in the frequency band corresponding to the antenna beamwidth that is proportional to the integral of the brightness distribution weighted by the antenna gain; that is, to the convolution of the antenna pattern with the brightness distribution. It is clear that, if the earth were an infinite plane, the intersection of the conical beam center with the terrain would be a circle, an ellipse, a parabola, or one sheet of a hyperbola. For a spherical earth, the geometry is not quite so simple, but this circumstance does not alter the essential features of the terrain-instrument relationship. It is clear that no useful image can be produced if the array axis is held fixed.

"In operation, the SPINRAD array is rotated in a plane. The axis of rotation is directed toward the terrain. Ideally, this axis would be directed at the point directly beneath the vehicle, although some latitude is available in this respect. For the remainder of this study, it will be helpful to visualize the axis of rotation directed to the point directly beneath the vehicle, although no use will be made of this specialization of the SPINRAD operating geometry. For each position of the array axis, the output of the instrument may be thought of as a set of strip integrals of the brightness distribution convolved with the antenna pattern. A fundamental question that now arises is whether the collection of these sets of strip integrals, taken for all rotation angles of the array in a plane, suffices to determine the brightness distribution that gives rise to this collection of strip integrals. It is, of course, to be expected that the resolution of any resulting image will be limited by the antenna beamwidth taken across the conical beam.

"We note that the collection of strip integrals obtained as explained above constitutes an integral transform. Thus, the first fundamental question can be phrased as, "Does the integral transform have an unique inverse?" If the answer to this question is affirmative, a second fundamental question concerns the numerical algorithm to be employed for inverting the integral transform (determining the brightness distribution) and its stability in the presence of instrumental errors, noise, and roundoff errors in the data reduction process. This second question is of no less importance than the first inasmuch as uniqueness of the inverse is of only academic interest in the absence of a stable algorithm for finding this inverse.

"The purpose of this study is to answer the fundamental questions raised above. For the study, it will be desirable to make a conceptual simplification by neglecting the non-zero widths of the conical beams. This has the advantage that it permits development of a comprehensive theory which is, in every essential respect, parallel to that for the Radon transform. The Radon transform has been employed extensively in radio astronomy (for small fields of view) and in computerized tomography. In these applications, the actual transforms also appear as strip integrals, but these strip integrals are idealized as line integrals and the effect of the non-zero strip widths is taken into account subsequently by means of a convolution which limits the achievable resolution.

"The organization of the remainder of the study is as follows. The Spinrad and Radon transforms are defined in Section 2 as line integrals. In Section 3, explicit representations are obtained for these line integrals as integrals with respect to a single real variable. These representations are then employed in Section 4 to establish relations between the Spinrad and Radon transforms. The first of these relations is an approximation valid for the case where the field of view is small; whereas, the second is an exact relationship, valid for an arbitrary field of view, by means of which the Spinrad transform is expressible in terms of a Radon transform. The uniqueness of the inverse of the Spinrad transform follows at once from this result. Moreover, the numerical algorithms for inversion of the Radon transform are immediately available for inversion of the Spinrad transform . . . .

"2. Definition of the Spinrad and Radon Transforms"

"We begin by observing that the natural spatial domain for discussion and analysis of a radiometer is the surface of a unit sphere centered at the instrument. This is the case because the radiometer measures brightness temperature as a function of angle; range plays no role in the operation of the instrument, although it does enter when converting angular resolution into linear resolution on the terrain when the desired end product is a terrain image or map. Any sphere with its center at the radiometer would serve for the purpose of discussion and analysis, but the unit sphere is especially appropriate inasmuch as the length of the arc of a great circle on this sphere is equal to the radian measure of the angle subtended by this arc at the center of the sphere, and the area of a region on the surface of the sphere is equal to the solid angle subtended by this region measured in steradians. Motivated by these considerations, we imagine the brightness temperature distribution of the terrain projected onto the surface of the unit sphere described above. Once the brightness distribution on the surface of the sphere has been determined, it is a simple matter to project it back onto the earth to form a radiometric image of the terrain.

"At this point, it is helpful to introduce spherical polar and cartesian coordinate systems as reference to these systems will somewhat facilitate description of the SPINRAD geometry and definition of the Spinrad transform. The primary coordinate system is a spherical polar coordinate system with angular coordinates $\theta$ and $\phi$, where $\theta$ is the angle of a vector from the origin to a point P measured from the pole and $\phi$ is the azimuth of this vector measured in the counterclockwise direction. The spherical polar coordinate system is centered at the instrument and the pole lies on the axis of rotation of the array antenna, in the direction of the region to be observed by the instrument. The cartesian coordinate system also has its origin at the instrument. Its positive Z axis lies in the direction of the pole and its positive X axis in the direction $\theta=\phi=0$. These two coordinate systems are sketched in FIG. 9. It is convenient to follow convention by sketching the pole in the upward direction but it should be remembered that, with this convention, the terrain will lie above the equatorial (or X-Y) plane.

"The axis of the SPINRAD antenna will lie in the equatorial plane, and we select a positive sense for this axis. Let $\beta$ be the angle between the positive direction of the array axis (henceforth referred to merely as "the direction of the array axis" for brevity) and the X axis. It will also be convenient to introduce an X', Y', Z' coordinate system obtained by rotating the X, Y, Z coordinate system about the Z axis so that the X' axis lies along the (positive) array axis. This auxiliary coordinate system is shown superimposed on the primary spherical and cartesian coordinate systems in FIG. 10. Observe that the azimuth of the point P measured with respect to the direction of the positive X' axis is $\phi-\beta$.

"Let us now consider the operation of the SPINRAD relative to the brightness distribution on the unit sphere. To this end, we consider the totality of all beams formed by the linear array. Let $\alpha$ be the angle between the (positive) array axis and the center of a beam. The beam will have a conical shape. On making the simplification described in Section 1, in which we neglect the non-zero beamwidth, we take each beam to be represented by a conical sheet with semi-apex angle $\alpha$. This conical sheet will intersect the unit sphere in a circle whose center lies on the X' axis. Thus, with the initial approximation that strip integrals on the unit sphere are to be replaced by line integrals, we see that the radiometer output at a frequency corresponding to the beam whose center makes an angle $\alpha$ with respect to the array axis will be proportional to the line integral of the brightness distribution on the sphere taken around the circle of intersection of the cone with the sphere. The proportionality factor will depend on the semi-apex angle $\alpha$. Since the proportionality factor will be known, it is a straight-forward matter to account for it in determining the value of the approximating line integrals from the measured data. To this approximation, the data available from the SPINRAD consists of the totality of these line integrals for all semi-apex angles, $\alpha$, and all azimuth angles, $\beta$.

"Two points should be recognized before we proceed further. First, it is clear that points on the unit sphere located symmetrically with respect to the equatorial plane always contribute symmetrically to the line integrals. This is true for each and every line integral because the array axis remains in the equatorial plane as the array rotates. It follows from this observation that we cannot expect to resolve the brightness of a point on the unit sphere from its reflection in the equatorial plane. The system is inherently and necessarily ambiguous with respect to such symmetrically located points on the upper and lower hemispheres. Accordingly, any useful SPINRAD system must restrict its coverage to either the upper hemisphere or the lower hemisphere if an unambiguous radiometric image is to be obtained. In practice, this ambiguity will be suppressed by controlling the vertical cutoff of the antenna pattern so that the gain is effectively zero in one hemisphere. The great circle on the equator may be expected to be a singular region for the inversion problem inasmuch as it is the boundary between the upper and lower hemispheres. Accordingly, the vertical cutoff of the SPINRAD array will be chosen to suppress a region around the equator of the unit sphere, as well as either the upper or the lower hemisphere. We may therefore confine our consideration to a single hemisphere, which we take to be the upper hemisphere, and we may suppose that the brightness distribution, as seen by the instrument, vanishes in some band around the equator.

"Second, we must consider somewhat more carefully the range of the semi-apex angle $\alpha$ defined previously. In general, the frequency-scanned array will be capable of forming beams on either side of the broadside direction. This observation implies that the angle $\alpha$ may be obtuse as well as acute, with the consequence that all data obtainable from the SPINRAD instrument are generated as the antenna rotates through 180 degrees. While referring to an obtuse angle as the semi-apex angle of a conical sheet is unconventional, it remains an accurate description of the physical situation relative to the frequency-scanned antenna. For the sake of the analysis to follow, two choices are available. Either we may allow obtuse as well as acute semi-apex angles for the conical sheet beams and take all data to be obtained during a 180 degree rotation, or we may imagine that $\alpha$ is confined to the region $0° \leq \alpha \leq 90°$ and take the data to be obtained during a full 360 degree rotation. It is clearly irrelevant which viewpoint is adopted as the totality of resulting data is the same in either case. It will be seen that an entirely similar situation arises for the classical Radon transform, although for a very different geometry.

"We are now in a position to define the Spinrad transform. Let a brightness distribution be given on, say, the upper hemisphere of the unit sphere, and let this distribution vanish on the equator. (As will become apparent subsequently, it will actually be desirable for the brightness distribution, as seen by the antenna, to vanish in a region around the equator.) The Spinrad transform is now defined as the totality of line integrals, $$I_S(C) = \int_C b \, d\sigma \quad (1)$$

taken over the semicircles $C(\alpha,\beta)$ in which the conical sheets with semi-apex angle $\alpha$ and azimuth angle $\beta$ intersect the upper hemisphere of the unit sphere on which the brightness distribution $b()$ is defined. Here, the element of arc length is written as $d\sigma$ rather than $ds$, as is customary, as $s$ is reserved for another purpose to be consistent with its use in the theory of the Radon transform. The element of arc length, $d\sigma$, is taken to be positive, so that it is immaterial in which direction along the curve the integration is taken.

"Next we define the Radon transform. The definition given here is somewhat more abstract than that which appears in the literature, but is equivalent to it. The equivalence will become apparent in Section 4 when an explicit representation of the Radon transform is developed. The advantage of the present abstract definition is that it shows clearly the analogy between the Spinrad and Radon transforms. Let $g()$ be a function defined on a plane and let L be a straight line in this plane. The Radon transform is the totality of line integrals, $$I_R(L) = \int_L g \, d\sigma \quad (2)$$

taken over all straight lines in the plane. As for the Spinrad transform, the element of arc length is always taken to be positive, so that the direction of integration along a straight line is immaterial.

"When specific representations are obtained for the Spinrad and Radon transforms as integrals with respect to a real variable $u$, as a matter of convenience, the directions of integration will be chosen so that $u$ increases in these directions.

"3. Explicit Representations for the Spinrad and Radon Transforms"

"We begin by deriving an explicit representation for the Radon transform as this derivation suggests the manner in which parameters should be chosen for an explicit representation of the Spinrad transform. For this purpose, we choose a cartesian coordinate system in the plane and represent the function $g()$ of position in this plane as $g(x,y)$. Consider now a line L at a distance $s$ from the origin and perpendicular to a line through the origin which makes an angle $\beta$ with the positive X axis, as illustrated in FIG. 11. It is clear that every pair consisting of a non-negative real number $s$ and an angle $\beta$ defines a line and that all possible lines can be obtained by appropriate choices of $s$ and $\beta$.

"Examination of FIG. 11 reveals that all possible straight lines in the plane are generated by pairs $(s,\beta)$ with $s \geq 0$ and $0° \leq \beta < 360°$ and that, moreover, each straight line is determined by one, and only one, such pair with $s$ and $\beta$ in these ranges. However, there is an alternative way of generating all possible straight lines. Let $s$ now be a directed distance which may have either positive or negative values. If $s$ is positive, the pair $(s,\beta)$ determines the line at a distance $s$ from the origin in the positive direction of the ray from the origin which makes an angle $\beta$ with the positive X axis, while if $s$ is negative, the pair $(s,\beta)$ determines the line at a distance $|s|$ from the origin along the negative direction of the ray from the origin which makes an angle $\beta$ with the positive X axis. With this convention, the pairs $(s,\beta)$ and $(-s, \beta+180°)$ define the same line. Notice that the convention here described for the case where $s$ is negative is equivalent to the means by which the point corresponding to the polar coordinates $(\rho,\theta)$ is defined when $\rho$ is negative. This is not mere coincidence as L is determined by the point on the ray from the origin through which it passes, and $s$ and $\beta$ are the polar coordinates of this point. Further consideration shows that, when negative values of $s$ are permitted, all possible straight lines in the plane are determined by the pairs $(s,\beta)$ when $\beta$ is restricted to the range $0° \leq \beta < 180°$.

"The situation described above for the Radon transform when negative values of the distance $s$ are permitted is entirely analogous to that for the Spinrad transform when obtuse semi-apex angles $\alpha$ are permitted for the conical sheets. As for the Spinrad transform, it is irrelevant to the theory whether the totality of contours on which the line integrals are taken is obtained for $s \geq 0$, $0° \leq \beta < 360°$ ($0 \leq \alpha \leq 90°$, $0° \leq \beta < 360°$ for the Spinrad case) or for $s$ arbitrary and $0° \leq \beta < 180°$ ($0 \leq \alpha \leq 180°$, $0° \leq \beta < 180°$ for the Spinrad case); the totality of data is the same. In the conventional approach to the Radon transform, this transform is defined initially for $s \geq 0$, $0° \leq \beta < 360°$. When Fourier techniques are to be employed for inversion, the definition is then extended to negative $s$ by taking the value of the transform corresponding to the pair $(s, \beta)$ to be equal to its value for the pair $(-s, \beta+180°)$. In all cases, of course, it is understood that the transform is a periodic function of $\beta$ of period 360 degrees. In the following derivation of the explicit representation for the Radon transform, we permit $s$ to have both positive and negative values as this convention provides some insight for the corresponding Spinrad derivation. It should be kept in mind that which of the two conventions regarding the range of $s$ is employed will have no effect on the final results as the same data are defined by the transform in either case.

"We now introduce an X', Y' coordinate system by rotating the X, Y coordinate system by an angle $\beta$. The two coordinate systems are shown superimposed in FIG. 12.

"Let the coordinates of a point P in the X, Y coordinate system be $(x, y)$ and let the coordinates in the X', Y' coordinate system be $(s, u)$. These coordinates are related by the orthogonal transformation $$s = x \cos \beta + y \sin \beta,$$
$$u = x \sin \beta + y \cos \beta$$

and its inverse, $$x = s \cos \beta - u \sin \beta,$$
$$y = s \sin \beta + u \cos \beta.$$

The coordinates $s$ and $u$ are the projections of the point P on the X' and Y' axes, respectively. A necessary and sufficient condition that a point lie on a line orthogonal to the X' axis is that its projection on this axis be a constant. Thus, the line L is given in parametric form by Equation 4 with $s$ fixed, where $u$ assumes all real values.

We have thus found a simple parametric representation for the line L in which the parameters s and $\beta$ are fixed. Moreover, all the parameters s, u, and $\beta$ have a simple geometrical significance, and the value of the function g(x,y) along this line is given in terms of the variable parameter u by g(s cos $\beta-\mu$sin $\beta$, s sin $\beta$+u cos $\beta$).

"From the preceding paragraph, it is clear that u is a natural choice for the variable of integration in a representation of the Radon transform as an integral with respect to a real variable. We take the direction of integration along L to be that of the positive Y' axis. This choice assures that du will be positive in the direction of integration, so that we will have $$d\sigma = du. \tag{5}$$

From these observations, those of the preceding paragraph, and the definition given for the Radon transform in Section 2 (Equation 2), we have at once that $$I_R(L) = \int_{-\infty}^{\infty} g(s\cos\beta - u\sin\beta, s\sin\beta + u\cos\beta)du. \tag{6}$$

The right side of Equation 6 is the usual definition of the Radon transform. Since this integral depends explicitly on s and $\beta$, this integral is frequently written as [Rg](s,$\beta$), so that $$[Rg](s,\beta) = \int_{-\infty}^{\infty} g(s\cos\beta - u\sin\beta, s\sin\beta + u\cos\beta)du. \tag{7}$$

"To obtain an explicit representation of the Spinrad transform as an integral with respect to a real variable, we proceed by analogy with the foregoing derivation of Equation 6. Note the important role played by the notion of a projection in this derivation. The projections of a point on the unit sphere onto the X, Y, Z coordinate axes are its direction cosines, l, m, n, respectively, with respect to this coordinate system. We may therefore expect that the direction cosines will play the role of the cartesian coordinates cosines, l and m, say, are needed to specify the position of a point on the upper hemisphere of the unit sphere because the direction cosines satisfy the condition $$l^2 + m^2 + n^2 = 1. \tag{8}$$

On the upper hemisphere, n is non-negative so that it is determined explicitly from Equation 8 as $$n = \sqrt{1 - l^2 - m^2}. \tag{9}$$

For a point P on the unit sphere with spherical polar coordinates ($\theta,\phi$), l, m, and n are given by (cf FIG. 9), $$l = \sin\theta\cos\phi$$

$$m = \sin\theta\sin\phi$$

$$n = \cos\theta. \tag{10}$$

In view of the fact that the position of a point on the upper hemisphere is determined by l and m alone, we will find it convenient for all that follows to use l and m for coordinates on this hemisphere. Accordingly, we consider the brightness distribution to be a function of l and m, so that b( ) will be written as b(l,m).

"Let s and u be the projections (direction cosines) of a point on the unit sphere on the auxiliary cartesian axes X', Y', respectively, defined in Section 2 and shown in FIG. 10. Since the X', Y', Z' coordinate system is obtained by rotating the X, Y, Z coordinate system about its Z axis through the angle $\beta$, s and u are related to l and m by equations of the same form as Equations 3 and 4, whence $$s = l\cos\beta + m\sin\beta,$$

$$u = -l\sin\beta + m\cos\beta, \tag{11}$$

and $$l = s\cos\beta - u\sin\beta,$$

$$m = s\sin\beta + i\cos\beta. \tag{12}$$

Now let the SPINRAD axis lie at an azimuth $\beta$ and consider the intersection of the conical sheet with semi-apex angle $\alpha$ with the unit sphere. This intersection defines a circle of radius sin $\alpha$. The necessary and sufficient condition that a point P on the unit sphere lie on this circle is that its projection on the X' axis be cos $\alpha$; that is, in the X',Y' direction cosine coordinate system, the equation for the circle on the unit sphere is just $$s = \cos\alpha. \tag{13}$$

The direction cosines relative to the X',Y' axes thus constitute a set of coordinates for points on the upper hemisphere of the unit sphere for which the locus of interest is obtained by setting the projection on the X' axis equal to a constant.

"Since the Z and Z' axes coincide, the projection of a point on the unit sphere onto the Z' axis is the same as that onto the Z axis, namely n. As the radius of the circle in which the conical sheet with semi-apex angle $\alpha$ intersects the sphere is sin $\alpha$, the equation of this circle in X', Y', Z' coordinates is $$u^2 + n^2 = \sin^2\alpha,$$

$$s = \cos\alpha. \tag{14}$$

This circle is parallel to the Y'-Z' plane. Its projection onto this plane is shown in FIG. 13; the lower half of the circle is dashed to emphasize that the line integral in terms of which the Spinrad transform is defined is taken only over the upper half of the circle.

"By analogy with the foregoing derivation of the explicit representation for the Radon transform, we choose the projection, u, of the generic point on the path of integration onto the Y' axis as the variable of integration. We now take the direction of integration along the semicircle to be in the clockwise direction, as indicted by the arrow in FIG. 13. This choice assures that u is monotonically increasing in the direction of integration.

"Next, we express the element of arc length, d$\sigma$, in terms of du. This is done by means of the well-known formula for the element of arc length in a plane, $$d\sigma = \sqrt{1 + \left(\frac{dn}{du}\right)^2} \, du; \quad (15)$$

the positive sign is chosen on the radical as du will be non-negative for the prescribed direction of integration along the semicircle. From Equation 14, we have for points on the upper semicircle (which lies on the upper hemisphere of the unit sphere), $$n = \sqrt{\sin^2 \alpha - u^2} \quad (16)$$

so that $$\frac{dn}{du} = \frac{-u}{\sqrt{\sin^2 \alpha - u^2}}. \quad (17)$$

On using Equation 17 in Equation 15, the expression for the element of arc length becomes, $$d\sigma = \sqrt{\frac{\sin^2 \alpha}{\sin^2 \alpha - u^2}} \, du. \quad (18)$$

Hereafter, we take s to be given by Equation 13. In terms of this parameter, Equation 18 assumes the form, $$d\sigma = \sqrt{\frac{1 - s^2}{1 - s^2 - u^2}} \, du. \quad (19)$$

"We are now in a position to give the desired explitcit representation for the Spinrad transform. From FIG. 13, it is clear that the variable u varies from $-\sin \alpha$ to $\sin \alpha$ along the path of integration. In terms of s, u thus varies over the range, $$-\sqrt{1 - s^2} \leq u \leq \sqrt{1 - s^2}. \quad (20)$$

Along the path of integration, the direction cosines l and m are given in terms of the parameters s, u, and $\beta$ by Equation 12, so that we have $$b(l,m) = b(s \cos \beta - u \sin \beta, s \sin \beta + u \cos \beta). \quad (21)$$

From Equations 19, 20, and 21 and the definition of the Spinrad transform (Equation 1), it follows at once that $$I_S(C) = \sqrt{1 - s^2} \, b(s\cos\beta - u\sin\beta), \quad (22)$$

$$\sqrt{1 - s^2} \, s\sin\beta + u\cos\beta) \sqrt{\frac{1 - s^2}{1 - s^2 - u^2}} \, du.$$

By analogy with the practice for the Radon transform (Equation 7), the integral on the right side of Equation 22 will be written as $[Sb](s,\beta)$, so that $$[Sb](s,\beta) \quad (23)$$

$$[Sb](s,\beta) = \sqrt{1 - s^2} \, b(s\cos\beta - u\sin\beta, \quad (23)$$

$$\sqrt{1 - s^2} \, s\sin\beta + u\cos\beta) \sqrt{\frac{1 - s^2}{1 - s^2 - u^2}} \, du.$$

This is the desired result. Equation 23 constitutes the basis for all the subsequent analytical work in this study.

"4. Relations between the Spinrad and Radon Transforms"

"In this section, the explicit integral representation for the Spinrad transform, given by Equation 23, will be examined in some detail to determine the relationship between the Spinrad and Radon transforms.

"First, we consider the approximations that may be made to the integral on the right side of Equation 23 for the case where the field of view is small and concentrated in the direction of the pole ($\theta=0°$ in the coordinate system of FIG. 9). This is the case of interest in radio astronomy, where the small field of view is assured by the patterns of the individual antennas in the interferometers employed for data acquisition. The field of view limitation means that b(l,m) may be taken to vanish outside of a region where $$l^2 + m^2 = s^2 + u^2 << 1. \quad (24)$$

The brightness distribution is only defined in the region where $$l^2 + m^2 \leq 1 \quad (25)$$

by virtue of the fact that l and m are direction cosines. We now extend b(l,m) to the region where $l^2+m^2>1$ by means of the equation, $$b(l,m) = 0 \text{ for } l^2 + m^2 > 1. \quad (26)$$

Clearly, b(l,m) has no physical meaning in the extended region, but the extension is a legitimate and useful mathematical artifice.

"In the region where the inequality of Equation 24 holds, we have to a good approximation, $$\frac{\sqrt{1 - s^2}}{\sqrt{1 - s^2 - u^2}} \approx 1. \quad (27)$$

Observe also that Equation 20, which defines the range of the variable $\mu$ in Equation 23, is equivalent to $$l^2 + m^2 = s^2 + u^2 \leq 1. \quad (28)$$

On making use of the fact that the extended brightness distribution vanishes outside of this region and by making the approximations of Equation 27 in the integrand in Equation 23, we see that this equation can be written in the approximate form, $$[Sb](s,\beta) \approx \int_{-\infty}^{\infty} b(s\cos\beta - u\sin\beta, s\sin\beta + u\cos\beta) du. \quad (29)$$

Equation 29 holds for $|s| \leq 1$; $[Sb](s,\beta)$ has no physical significance when $|s| > 1$. However, we may extend the definition of $[Sb](s,\beta)$ to this region by the equation $$[Sb](s,\beta) = 0 \text{ for } |s| > 1. \tag{30}$$

We note that, as $b(l,m)$ vanishes outside of the region defined by Equation 28, the integral on the right side of Equation 29 will also vanish in the region $|s| > 1$. Hence, with the extended definition of $[Sb](s,\beta)$, the approximation of Equation 29 will be valid for all values of s.

"Comparison of Equation 29, now valid for all (real) values of s, with Equation 7 shows at once that, with the extended notion of the Spinrad transform defined by Equation 30, $$[Sb](s,\beta) \approx [Rb](s,\beta); \tag{31}$$

that is, the Spinrad transform may be approximated by the Radon transform in the small field of view case. The foregoing argument provides the theoretical basis for the a priori approximations made by radio astronomers for the small field of view case. However, an explicit treatment of the Spinrad transform does not seem to appear in the literature; the approximations are made ab initio without reference to an explicit integral representation and the Radon transform is used therafter.

"Next we turn to the derivation of an exact relation between the Spinrad and Radon transforms that is valid in the wide field of view case (that is, without the restriction imposed by Equation 24). First, we remove the factor $\sqrt{1-s^2}$ from the right side of Equation 23 by writing this equation in the form, $$\frac{[Sb](s,\beta)}{\sqrt{1-s^2}} = \int_{s^2+u^2 \leq 1} \frac{b(s\cos\beta - u\sin\beta, s\sin\beta + u\cos\beta)}{\sqrt{1-s^2-u^2}} du \tag{32}$$

Observe now that, by virtue of the identity, $$s^2 + u^2 = (s\cos\beta - u\sin\beta)^2 + (s\sin\beta + u\cos\beta)^2, \tag{33}$$

(this trivial identity is merely the explicit form of the identity $s^2 + u^2 = l^2 + m^2$, as is apparent by reference to Equation 12) Equation 32 assumes the form, $$\frac{[Sb](s,\beta)}{\sqrt{1-s^2}} = \tag{34}$$

$$\int_{s^2+u^2 \leq 1} \frac{b(s\cos\beta - u\sin\beta, s\sin\beta + u\cos\beta)}{\sqrt{1 - (s\cos\beta - u\sin\beta)^2 - (s\sin\beta + u\cos\beta)^2}} du$$

"We now define a function $h(l,m)$ for all real values of l and m by $$h(l,m) = \begin{cases} \frac{b(l,m)}{\sqrt{1-l^2-m^2}} & \text{for } l^2 + m^2 < 1, \\ 0 & \text{for } l^2 + m^2 \geq 1. \end{cases} \tag{35}$$

The continuity of $h(l,m)$ at the boundary $l^2+m^2=1$ is assured by the restriction imposed in Section 2 that $b(l,m)$ should vanish in some band around the equator of the unit sphere to preclude difficulties with the singularity of the inverse at the equator. With the notation of Equation 35, Equation 34 becomes, $$\frac{[Sb](s,\beta)}{\sqrt{1-s^2}} = \int_{s^2+u^2 \leq 1} h(s\cos\beta - u\sin\beta, s\sin\beta + u\cos\beta) du \tag{36}$$

Since, according to Equation 35, $h(l,m)$ vanishes outside of the region $s^2+u^2 = l^2+m^2 \leq 1$, Equation 36 may be rewritten in the form, $$\frac{[Sb](s,\beta)}{\sqrt{1-s^2}} = \int_{-\infty}^{\infty} h(s\cos\beta - u\sin\beta, s\sin\beta + u\cos\beta) du. \tag{37}$$

"As $h(l,m)$ is defined for all values of l and m, the integral on the right side of Equation 37 is meaningful for all (real) values of s. However, $[Sb](s,\beta)$ has only been defined for $|s| \leq 1$. As previously, we now extend the definition of $[Sb](s,\beta)$ to the region $|s| > 1$ by means of Equation 30. With this definition, Equation 37 remains valid for $|s| > 1$, and, hence, for all real values of s. As before, the fact that $[Sb](s,\beta)$ has no physical significance in the region $|s| > 1$ is irrelevant; the extended definition is only an artifice to assure the validity of Equation 37 for all real s.

"Comparison of Equations 37 and 7 shows that $$\frac{[Sb](s,\beta)}{\sqrt{1-s^2}} = [Rh](s,\beta), \tag{38}$$

where now the equality is exact. This result provides the means for answering the questions raised in Section 1 concerning the uniqueness of the inverse of the Spinrad transform and the stability of the numerical algorithms for its inversion.

"It is well known that the Radon transform possesses an unique inverse. Since, according to Equation 38, the Spinrad transform of $b(l,m)$ determines the Radon transform of $h(l,m)$, it follows from the uniqueness of the inverse of the Radon transform that $h(l,m)$ is uniquely determined by the Spinrad transform of $b(l,m)$ and, moreover, that $h(l,m)$ can be found by applying the inverse Radon operator, $R^{-1}$, to $[Sb](s,\beta)/\sqrt{1-s^2}$. In symbolic form, this result is $$h(l,m) = \left[ R^{-1}\left(\frac{[Sb](s,\beta)}{\sqrt{1-s^2}}\right) \right](l,m). \tag{39}$$

According to Equation 35, $b(l,m)$ may be found from $h(l,m)$ by means of $$b(l,m) = \sqrt{1-l^2-m^2}\, h(l,m) \text{ for } l^2+m^2 < 1, \tag{40}$$

and the case $l^2+m^2 < 1$ is the only case of interest as it is already known that $b(l,m) = 0$ on $l^2+m^2 = 1$. In practice, the field of view will be somewhat restricted so that $b(l,m)$ need only be determined from Equation 40 within some more restricted region $l^2+m^2 \leq p^2$. On combining Equations 39 and 40, we obtain the symbolic formula for determining the brightness distribution from the Spinrad transform, $$b(l,m) = \sqrt{1 - l^2 - m^2} \left[ R^{-1} \left( \frac{[Sb](s,\beta)}{\sqrt{1-s^2}} \right) \right] (l,m). \quad (41)$$

"It remains to discuss the question of numerical algorithms for inversion of the Spinrad transform. But Equation 41 shows that algorithms for inversion of the Radon transform may be used for this purpose. The problem of numerical inversion of the Radon transform has been the subject of much intensive research and several proven inversion algorithms with good stability properties are available. Accordingly, we may consider the problem of finding stable numerical inversion algorithms for the Spinrad transform as solved . . . ."

What is claimed is:

1. A radiometer for determining the mircrowave radiation distribution of a scene comprising:
    an antenna for providing an output as a function of microwave radiation received along fanbeams; said fanbeams collectively spanning said scene, said fanbeams having predetermined relative positions around an axis parallel to the antenna;
    means for moving said fanbeams; around a line of sight from the antenna to the scene
    an orientation sensor for providing an output as a function of the rotation orientation of said fanbeams;
    means for tranforming said outputs from said antenna and said orientation sensor into one-dimensional radiation functions, each of said radiation functions having a respective rotational orientation; and
    computing means for reconstructing the microwave radiation distribution of the scene from said radiation functions and their respective rotational orientations, wherein a two dimensional image of the scene are produced.

2. The radiometer of claim 1 further characterized in that said radiation function is a spatial frequency spectrum of radiation received from the scene.

3. The radiometer of claim 1 further characterized in that said radiation function is a projection of radiation received from the scene.

4. The radiometer of claim 1 further characterized in that said computing means includes means for correcting for beam shape.

5. The radiometer of claim 4 further characterized in that said fanbeams are conical sheets and said means for correcting for beam shape corrects for the conicity of said fanbeams.

6. The radiometer of claim 5 further characterized in that said antenna is adapted for frequency scanning.

7. The radiometer of claim 5 further characterized in that said antenna is adapted for delay scanning.

8. The radiometer of claim 4 further characterized in that said antenna is adapted for mechanical scanning.

9. The radiometer of claim 8 further characterized in that said means for correcting beam shape corrects for side-lobes and beam thickness.

* * * * *